(12) United States Patent
Han et al.

(10) Patent No.: US 6,760,494 B2
(45) Date of Patent: Jul. 6, 2004

(54) FIBER OPTICAL POLARIZER ASSEMBLY

(75) Inventors: Xinghua Han, Fremont, CA (US);
Yi-Ting Yao, Pleasanton, CA (US);
Chalres Leu, Fremont, CA (US);
Ga-Lane Chen, Fremont, CA (US)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 356 days.

(21) Appl. No.: 09/927,206

(22) Filed: Aug. 10, 2001

(65) Prior Publication Data

US 2003/0031396 A1 Feb. 13, 2003

(51) Int. Cl.$^7$ ................................................ G02B 6/00
(52) U.S. Cl. ............................................................. 385/11
(58) Field of Search ..................................... 385/11, 147

(56) References Cited

U.S. PATENT DOCUMENTS 5,706,371 A * 1/1998 Pan ................................ 385/11
5,734,762 A * 3/1998 Ho et al. ........................ 385/11
5,889,904 A * 3/1999 Pan et al. ....................... 385/24
6,535,655 B1 * 3/2003 Hasui et al. ................... 385/11

* cited by examiner

Primary Examiner—Lynn Feild
Assistant Examiner—Thanh-Tam Le
(74) Attorney, Agent, or Firm—Wei Te Chung

(57) ABSTRACT

The disclosure provides the fiber optic polarizer that is a conveniently packaged fiber/polarization beamsplitter combination for free space beam and integrated optics application. It eliminates the need for separate the fiber and polarizer, and takes the advantage of easy fabrication and low cost. The fiber optics polarizer is fabricated by fixing the single mode fiber and the polarization maintaining fiber on V-groove chuck. The polarization beamsplitter is fixed on a wafer. The V-groove chuck and the wafer are packaged in the hermetic sealing box with single mode fiber and the polarization maintaining fiber exposed at two opposite lengthwise ends of the box.

3 Claims, 3 Drawing Sheets

Top View of Fiber Optic Polarizer

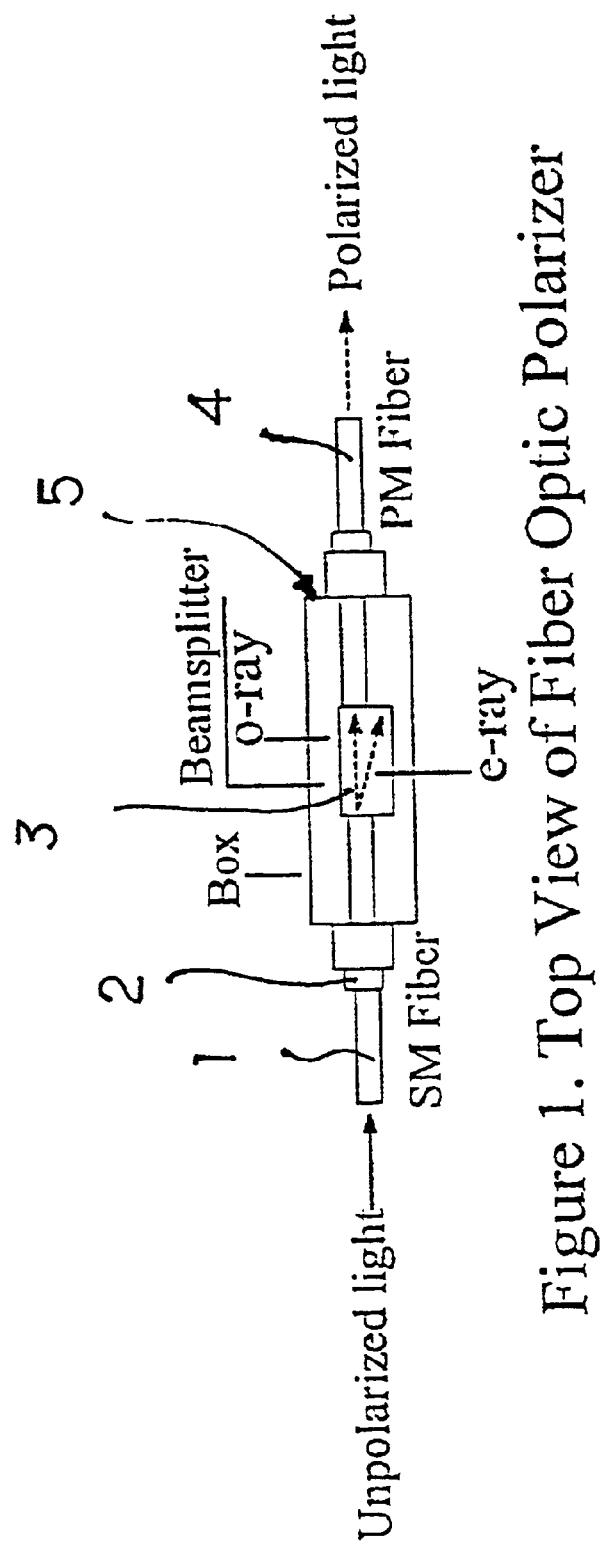
Figure 1. Top View of Fiber Optic Polarizer

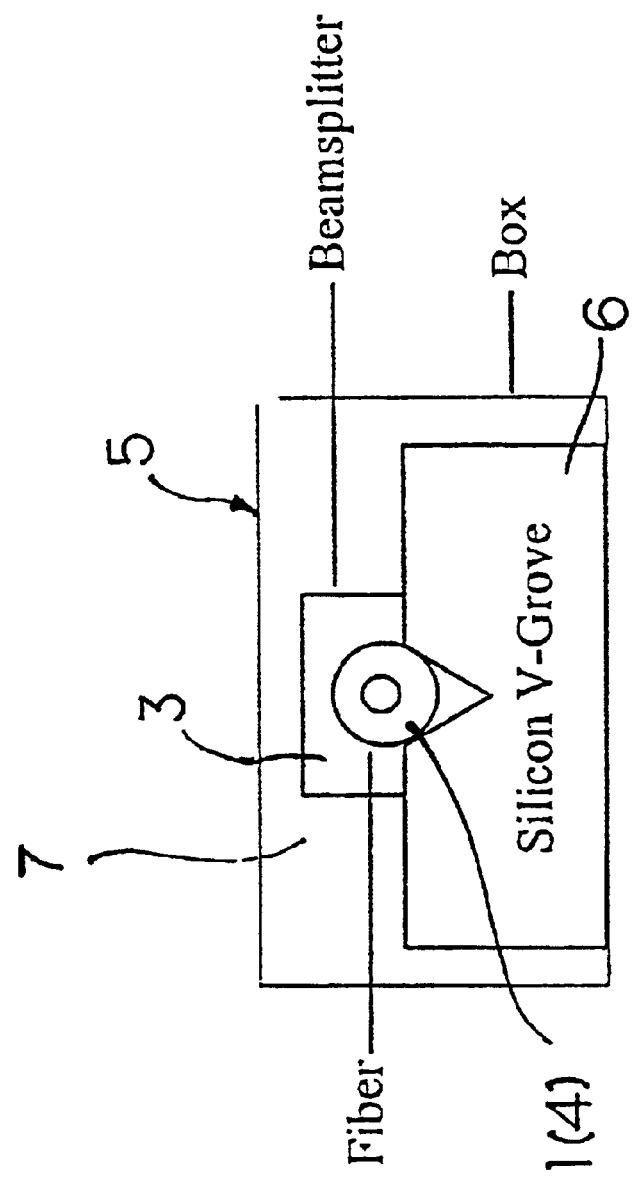
Figure 2. Head View of Fiber Optic Polarizer

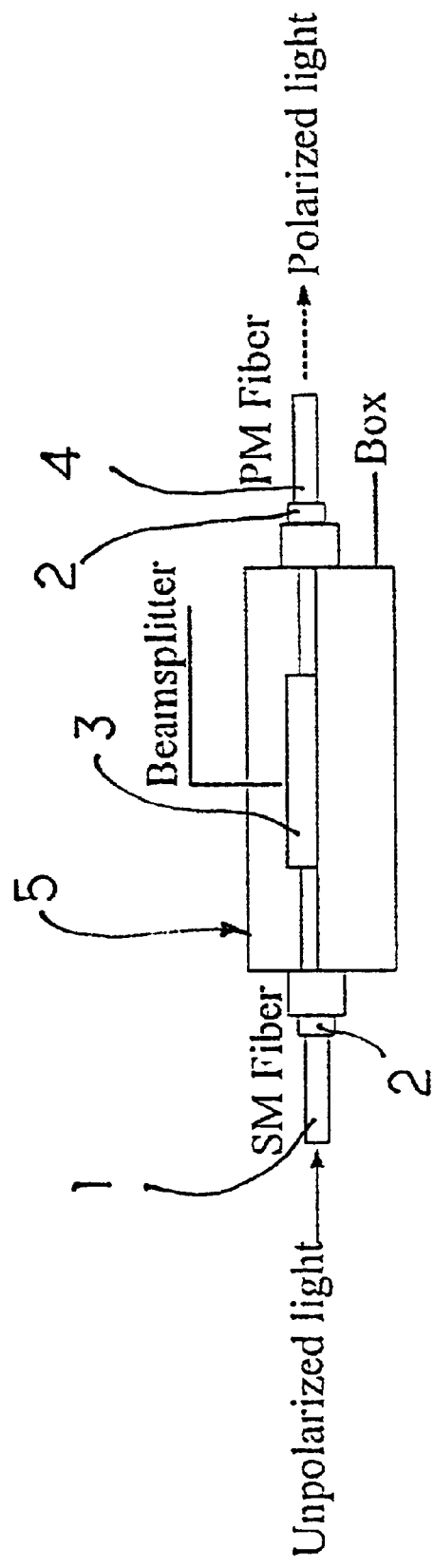
Figure 3. Side View of Fiber Optic Polarizer

FIBER OPTICAL POLARIZER ASSEMBLY

BACKGROUND OF THE INVENTION

1. Field of the Invention

The present invention relates to a new assembly method of fiber optical polarizer, which a beamsplitter is used to polarize the light from the single mode fiber. The beamsplitter is set up between single mode fiber and polarization mode fiber to be packaged by a box to be a single unit.

2. Description of Related Art

A polarizer is always set up in front of a light source to polarize the light beam in conventional way. After the light beam passed the polarizer, the polarized light will enter a receiver such as polarized maintains fiber, monochromator, etc. So a polarizer is separated from a light source and a receiver. The three separated will waste space and cause high cost.

U.S. Pat. No. 4,531,811 shows a multi-core polarization element inserts in a inline fiber communication. The design uses different core to separate the transmission of different polarization light. An input fiber is in front of the polarization fiber and an output fiber is connected to the other side of the polarization fiber.

U.S. Pat. Nos. 4,515,436 and 4,589,728 use fiber to be a polarization element. Both do not discuss the configuration of the polarization element in the fiber optics system.

U.S. Pat. No. 4,852,959 introduces the adjustment mechanics for an optical polarizer. In this patent, it does not show any connection of the polarization element.

The beam splitter is a discrete component in a conventional optics system design. The disadvantage of the traditional arrangement is not stable, difficult fabrication, and higher cost.

Due to these disadvantages of traditional polarizer design, a new polarizer module is developed. In the new fiber optics polarizer module, the single mode fiber, the beam splitter, and the polarization maintaining fiber are sealed together by a box to reduce the volume and lower the cost.

BRIEF SUMMARY OF THE INVENTION

An object of the present invention is to provide an integrated fiber optics polarizer component. A beam splitter is used to separated the unpolarized light to be ordinary ray (o-ray) and extraordinary ray (e-ray). The unpolarized light was though a single mode to the beam splitter. After the unpolarized ray was though the beam splitter, the o-ray went through the polarization maintaining fiber.

The fiber optics polarizer is fabricated by fixing the single mode fiber and polarization maintaining fiber on silicon V groove chuck with epoxy adhesive, and then the beam splitter is fixed on silicon wafer with epoxy. The whole silicon substrate is packaged in the hermetic sealing box.

BRIEF DESCRIPTION OF THE DRAWINGS

FIG. 1 is the top view of the new fiber optics polarizer.

FIG. 2 is the head view of the new fiber optics polarizer.

FIG. 3 is the side view of the new fiber optics polarizer.

DETAIL DECRIPTION OF THE INVENTION

Referring to FIG. 1, the top view of the new fiber optics polarizer comprises of the single mode (SM) fiber 1, the cladding plastic layer 2, the beam splitter 3, the polarization maintaining (PM) fiber 4, the metal or plastic box 5.

From FIG. 1, unpolarized light transmits through the single mode (SM) fiber 1 to be separated into ordinary ray (o-ray) and extraordinary ray (e-ray) by the beam splitter 3. The o-ray is the polarized light to enter the polarization mode (PM) fiber 4 from the beam splitter 3. The box 5 is used to pack the integrated component. The cladding plastic layer 2 is used to protecting the single mode fiber 1 and the polarization maintaining fiber 4.

Referring to FIG. 2, the head view of the new fiber optics polarizer comprises of the single mode (SM) fiber 1 or the polarization maintaining fiber 4, the beam splitter 3, the metal or plastic box 5, the silicon V-grove chuck 6.

From FIG. 2, the single mode (SM) fiber 1 or the polarization maintaining fiber 4 is stick on the silicon V-grove chuck 6 by epoxy adhesive. The box 5 is used to seal all the components including the silicon V-grove chuck 6, the beam splitter 3, the single mode (SM) fiber 1 or the polarization maintaining (PM) fiber 4.

Referring to FIG. 3, the side view of the new fiber optics polarizer comprises of the single mode (SM) fiber 1, the cladding plastic layer 2, the beam splitter 3, the polarization maintaining (PM) fiber 4, the metal or plastic box 5, silicon V-grove chuck 6, silicon wafer 7.

From FIG. 3, unpolarized light transmits through the single mode (SM) fiber 1 to be separated into ordinary ray (o-ray) and extraordinary ray (e-ray) by the beam splitter 3. The o-ray is the polarized light to enter the polarization mode (PM) fiber 4 from the beam splitter 3. The cladding plastic layer 2 is used to protecting the single mode fiber 1 and the polarization maintaining fiber 4. The single mode (SM) fiber 1 and the polarization maintaining (PM) fiber 4 are stick on the silicon V-grove chuck 6 by adhesive. The beam splitter 3 is stick on the silicon wafer 7 by adhesive. The box 5 is used to seal all components to be an integrated fiber optics polarizer.

It is to be understood, however, that even though numerous, characteristics and advantages of the present invention have been set forth in the foregoing description, together with details of the structure and function of the invention, the disclosed is illustrative only, and changes may be make in detail, especially in matters of shape, size, and arrangement of parts within the principles of the invention to the full extent indicated by the broad general meaning of the terms in which the appended claims are expressed.

What is claimed is:

1. A fiber optic polarizer comprising:

a chuck defining a groove in a face along a lengthwise direction thereof;

a single mode fiber installed on the face around one end of said groove;

a polarization-maintaining fiber installed on the face around the other end of said groove; a cladding plastic layer protected the single mode fiber and the polarization-maintaining fiber;

a polarization beamsplitter disposed between said single mode fiber and said polarization-maintaining fiber; and a box hermetically enclosing the chuck and the polarization beamsplitter with portions of the single mode fiber and polarization-maintaining fiber exposed to an exterior; wherein the single mode fiber or the polarization-maintaining fiber is stick on the chuck by epoxy adhesive and the box sealed the chuck, the polarization beamsplitter, the single mode fiber or the polarization-maintaining fiber;

the polarization beamsplitter is positioned to respectively align with the single mode fiber and the polarization-maintaining fiber at two opposite ends thereof to allow unpolarized light from the single mode fiber to enter the polarization beamsplitter at one end thereof and an o-ray of a polarized light to leave the polarization beamsplitter toward the polarization-maintaining fiber.

2. The polarizer as defined in claim 1, wherein the said polarization beamsplitter is fixed to a wafer above the chuck.

3. The polarization as defined in claim 1, wherein said groove is V-shaped, and both the single mode fiber and the polarization-maintaining fiber are fixed thereto.

* * * * *